(12) United States Patent
Choi et al.

(10) Patent No.: US 9,387,726 B2
(45) Date of Patent: Jul. 12, 2016

(54) AIRLESS TIRE

(71) Applicant: HANKOOK TIRE CO., LTD., Seoul (KR)

(72) Inventors: Seok Ju Choi, Daejeon (KR); Hak Joo Kim, Daejeon (KR); Man Seop Kim, Daejeon (KR); Kil Ju Ko, Daejeon (KR); Ki Ho Kang, Daejeon (KR); Yoon Jin Choi, Daejeon (KR)

(73) Assignee: HANKOOK TIRE CO., LTD. (KR)

( * ) Notice: Subject to any disclaimer, the term of this patent is extended or adjusted under 35 U.S.C. 154(b) by 376 days.

(21) Appl. No.: 13/922,218

(22) Filed: Jun. 19, 2013

(65) Prior Publication Data

US 2014/0000777 A1 Jan. 2, 2014

(30) Foreign Application Priority Data

Jun. 27, 2012 (KR) ........................ 10-2012-0069416

(51) Int. Cl.
*B60C 7/10* (2006.01)
*B60C 7/18* (2006.01)

(52) U.S. Cl.
CPC ... *B60C 7/10* (2013.01); *B60C 7/18* (2013.01); *B60C 2007/146* (2013.04)

(58) Field of Classification Search
CPC ...... B60C 7/00; B60C 7/10; B60C 2007/107; B60B 9/00; B60B 9/02; B60B 9/10; B60B 9/12; B60B 9/26
See application file for complete search history.

(56) References Cited

U.S. PATENT DOCUMENTS

| 5,042,544 | A  | * | 8/1991  | Dehasse ..................... B60C 7/12 152/302 |
| 6,615,885 | B1 | * | 9/2003  | Ohm ......................... B60B 9/26 152/11 |
| 7,108,331 | B2 | * | 9/2006  | Hurwitz ............. A63C 17/0066 152/40 |
| 8,104,524 | B2 | * | 1/2012  | Manesh .................... B60B 9/00 152/301 |
| 8,109,308 | B2 | * | 2/2012  | Manesh .................... B60C 7/14 152/326 |
| 8,113,253 | B2 | * | 2/2012  | Arakawa .................. B60B 9/10 152/11 |
| 8,176,957 | B2 | * | 5/2012  | Manesh .................... B60C 7/12 152/301 |
| 8,276,628 | B2 | * | 10/2012 | Hanada ..................... B60C 7/12 152/11 |
| 8,434,533 | B2 | * | 5/2013  | Albert ..................... B60C 17/06 152/152 |
| 8,578,607 | B2 | * | 11/2013 | Kim ......................... B60C 7/18 152/246 |
| 8,944,125 | B2 | * | 2/2015  | Manesh .................... B60C 7/12 152/326 |
| 9,004,127 | B2 | * | 4/2015  | Manesh .................... B60C 9/00 152/301 |

(Continued)

FOREIGN PATENT DOCUMENTS

| EP | 2428369 A     | 3/2012 |
| JP | 2008105644 A  | 5/2008 |

(Continued)

OTHER PUBLICATIONS

Extended European Search Report for EP13168820.2, mailed Oct. 10, 2013.

*Primary Examiner* — Brodie Follman (57) ABSTRACT

The present invention relates to an airless tire, and includes first and second bands that face each other with a distance interposed therebetween, a plurality of spokes that connect the first band to the second band and are provided at intervals, and first and second connecting members that connect the adjacent spokes. The spoke includes a first member of which one end is curved from the first band toward the second band, and a second member of which one end is curved from the second band toward the first band. The other ends of the first and second members are connected to each other, and the first and second members are curved in opposite directions.

20 Claims, 6 Drawing Sheets

(56) References Cited

U.S. PATENT DOCUMENTS

| | | | | |
|---|---|---|---|---|
| 9,108,470 B2 * | 8/2015 | Tercha | ............... | B60C 7/08 |
| 9,120,351 B2 * | 9/2015 | Mun | ............... | B60C 7/18 |
| 2009/0173421 A1 * | 7/2009 | Love | ............... | A63C 17/22 |
| | | | | 152/246 |
| 2009/0283185 A1 * | 11/2009 | Manesh | ............... | B60B 9/00 |
| | | | | 152/11 |
| 2010/0132865 A1 * | 6/2010 | Iwase | ............... | B60C 7/18 |
| | | | | 152/301 |
| 2010/0200131 A1 * | 8/2010 | Iwase | ............... | B29D 30/00 |
| | | | | 152/209.1 |
| 2011/0240193 A1 * | 10/2011 | Matsuda | ............... | B29D 30/00 |
| | | | | 152/246 |
| 2012/0060991 A1 * | 3/2012 | Mun | ............... | B60C 7/18 |
| | | | | 152/323 |
| 2012/0234444 A1 * | 9/2012 | Palinkas | ............... | B60C 7/18 |
| | | | | 152/246 |
| 2013/0240272 A1 * | 9/2013 | Gass | ............... | B60B 9/00 |
| | | | | 180/54.1 |
| 2014/0000777 A1 * | 1/2014 | Choi | ............... | B60C 7/18 |
| | | | | 152/246 |
| 2014/0083581 A1 * | 3/2014 | Schaedler | ............... | B60B 9/26 |
| | | | | 152/5 |
| 2014/0238561 A1 * | 8/2014 | Choi | ............... | B60C 7/18 |
| | | | | 152/17 |
| 2015/0122382 A1 * | 5/2015 | Choi | ............... | B60C 7/18 |
| | | | | 152/17 |
| 2015/0174953 A1 * | 6/2015 | Cron | ............... | B60B 9/26 |
| | | | | 152/11 |

FOREIGN PATENT DOCUMENTS

| | | |
|---|---|---|
| JP | 2008303333 | 12/2008 |
| JP | 2011178308 | 9/2011 |
| KR | 20120063616 A | 6/2012 |
| WO | 2007137858 A | 12/2007 |
| WO | 2008050503 A | 5/2008 |

* cited by examiner

AIRLESS TIRE

BACKGROUND

1. Field of the Invention

The present invention relates to an airless tire, and more particularly, to an airless tire which supports a load of a vehicle and of which a contact surface coming into contact with the ground is uniform and the durability of spokes are improved by the dispersion of stress for the improvement of ride quality.

2. Description of the Related Art

In general, a tire is one of components of a vehicle, and comes into direct contact with the road surface. Air present in the tire further improves ride quality by absorbing shock, which is caused by the unevenness of the road surface, through a buffer action like a spring.

Tires, which can achieve the controllability of a vehicle, can be classified into a radial tire, an airless tire, a solid tire, and the like according to the structure thereof. Among them, a radial tire (air tire type) is generally used in a car and a vehicle not having a special purpose. The radial tire has a complicated structure, and is manufactured by eight processes.

Further, in the radial tire, there is an inconvenience that air pressure absolutely important for the exhibition of performance and safety should be checked. Furthermore, the radial tire has a safety problem that a tire is damaged by an external object and shock while a vehicle is traveling.

Unlike this air tire, an airless tire is a tire of which production costs can be significantly reduced by a material and the simplification of processes and which is produced by a new process and a structure capable of reducing the amount of consumed energy and the amount of a generated harmful material. Moreover, the airless tire does not cause a problem that can occur due to the lack of air pressure or the like. In addition, the airless tire has an advantage of preventing a standing wave shape that is formed in the case of a radial tire and an advantage of significantly improving rotational resistance.

The airless tire has a structure that is completely different from the structure of the radial tire. Further, unlike the radial tire, the airless tire does not use compressed air in design at all. Accordingly, the airless tire is free from the risk of an accident that may occur during the travel of a vehicle due to the loss or lack of air pressure. Furthermore, unlike the case of the radial tire, the production costs of the airless tire can be significantly reduced by a material and the simplification of processes.

According to the structure of this airless tire, the airless tire includes a body that is made of an elastic material, a crown that functions as a tread and extends in a circumferential direction, and a side wall that is joined to the crown and extends.

Moreover, a non-pneumatic tire, which includes a reinforced annular band supporting a load and a plurality of web spokes transmitting load forces between the annular band and a wheel or a hub while being tensioned, has been known as Korean Patent Application Publication No. 2004-0027984. In recent years, an airless tire, which is adapted to perform a buffer action by a honeycomb-shaped buffer portion and to support pressure applied to the tire, also has been introduced in Korean Patent No. 1043001.

In the case of the airless tire including the plurality of web spokes, it has been introduced that a load is supported by only a tensile force of the web spokes.

However, when a load is supported by a tensile force and a compressive force, a more stable and appropriate tread area can be obtained as compared to a case where a load is supported by only a tensile force. Further, since it is possible to maximize vehicle performance, such as controllability, a braking force, and ride quality, further improved vehicle performance can be expected.

RELATED ART DOCUMENT

Patent Document

[Patent Document 1] Korean Patent No. 0810935 (Feb. 29, 2008)
[Patent Document 2] Korean Patent No. 1043001 (Jun. 14, 2011)

SUMMARY

The present invention provides an airless tire which supports a load of a vehicle and of which a contact surface coming into contact with the ground is uniform and the durability of the spoke and the absorption of shock, which is generated from a road surface and transmitted to a driver, are improved.

An airless tire according to an embodiment of the present invention includes first and second bands that face each other with a distance interposed therebetween, a plurality of spokes that connect the first band to the second band and are provided at intervals, and first and second connecting members that connect the adjacent spokes. The spoke includes a first member of which one end is curved from the first band toward the second band, and a second member of which one end is curved from the second band toward the first band. The other ends of the first and second members are connected to each other, and the first and second members are curved in opposite directions.

The first connecting member may be positioned at a portion where the first and second members are connected to each other and connects the adjacent spokes to form one spoke cell, and the second connecting member may be positioned between the adjacent second members to connect the adjacent spoke cells.

The first and second connecting members may be alternately disposed.

The airless tire may further include a tread that is connected to the outer surface of the second band, and a reinforcing layer that is positioned between the second band and the tread.

The reinforcing layer may be one selected from a group consisting of a steel wire, a steel belt, a fiber cord, a composite, a hollow tube, and the combination thereof.

The reinforcing layer may be one selected from a group consisting of basalt fiber, filaments based on basalt fiber, and the combination thereof.

Each of the first and second bands may be one selected from a group consisting of basalt fiber, filaments based on basalt fiber, and the combination thereof.

The radius ($R_1$) of curvature of the first member may be 40 mm or more and smaller than 50 mm, and the radius ($R_2$) of curvature of the second member may be 30 mm or more and smaller than 40 mm.

The length of the second connecting member may be longer than the length of the first connecting member.

The length of the second member may be longer than the length of the first member.

According to the embodiment of the present invention, since the airless tire includes the tread, the first band, the second band, the spokes, the first connecting member, the second connecting member, and the reinforcing layer, the structural stiffness of the spokes is improved.

Accordingly, a load of a vehicle is supported by the improvement of structural stiffness, a contact surface coming into contact with the ground is uniform, and the durability of spokes is improved by the dispersion of stress, particularly, the absorption of shock, which is generated from a road surface and transmitted to a driver, is improved. Therefore, it is possible to improve ride quality.

DETAILED DESCRIPTION

An embodiment of the present invention will be described in detail below with reference to the drawings so that those skilled in the art to which the present invention pertains can easily embody the present invention. However, the present invention may be embodied in various different forms, and is not limited to the embodiment to be described here. Like portions are denoted by the same reference numerals throughout this specification.

An airless tire according to an embodiment of the present invention will be described with reference to FIGS. 1 to 4.

Figure 1:
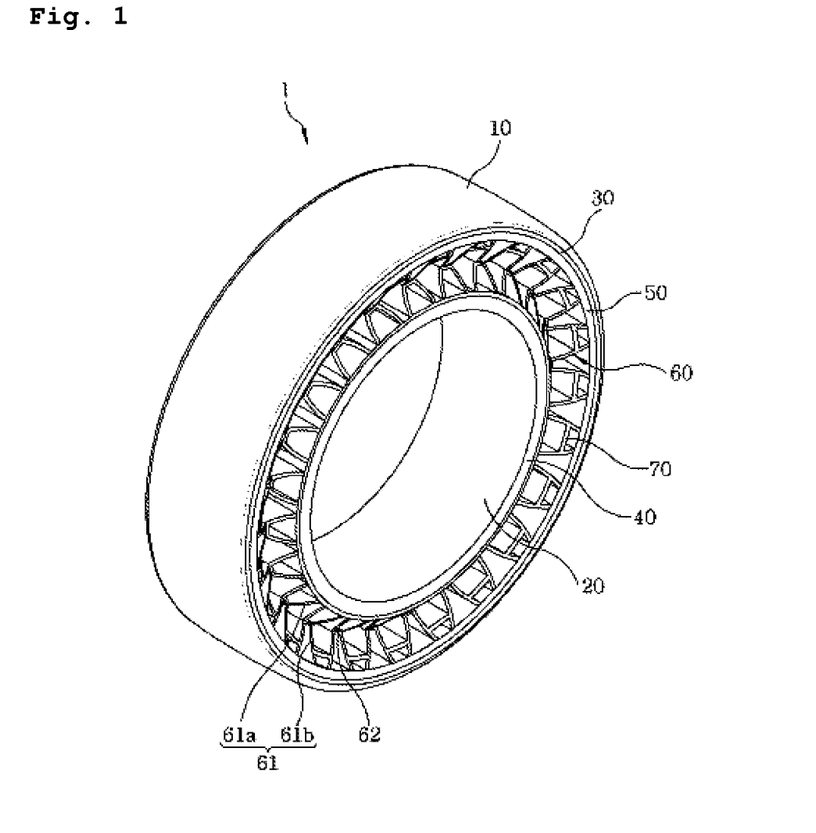
FIG. 1 is a perspective view of an airless tire according to an embodiment of the present invention.
Figure 2:
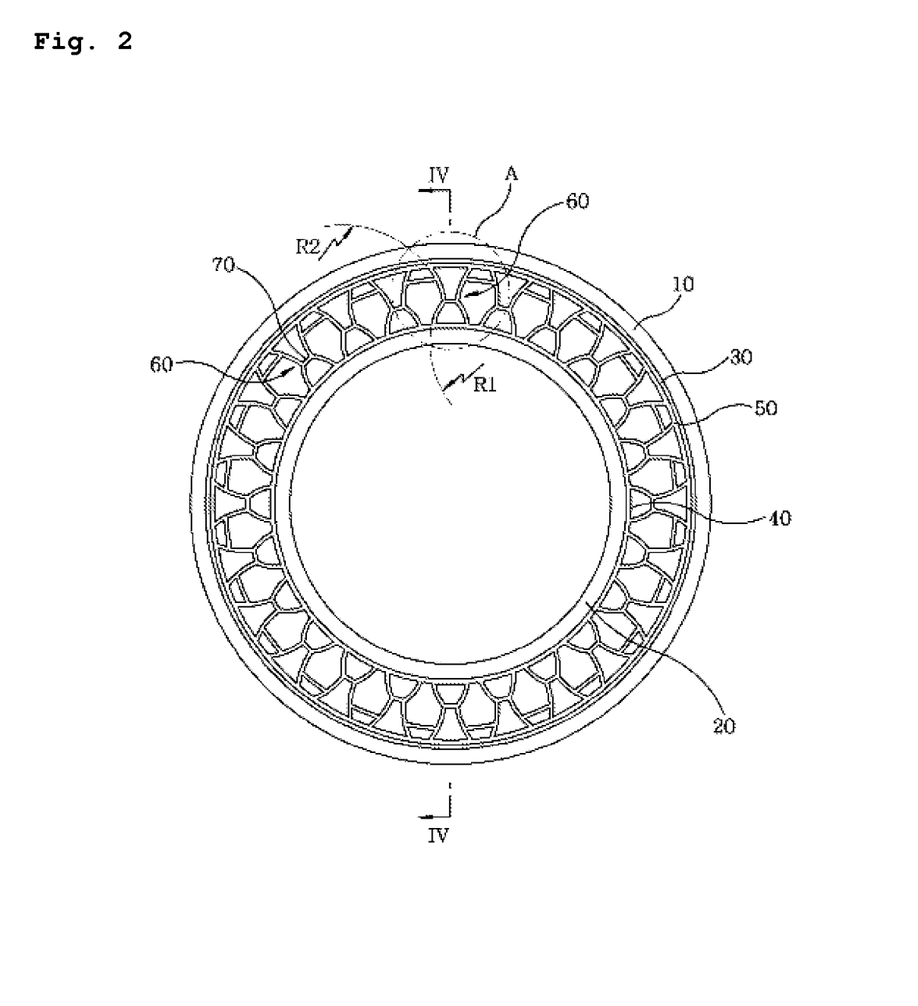
FIG. 2 is a front view of the airless tire shown in FIG. 1.
Figure 3:
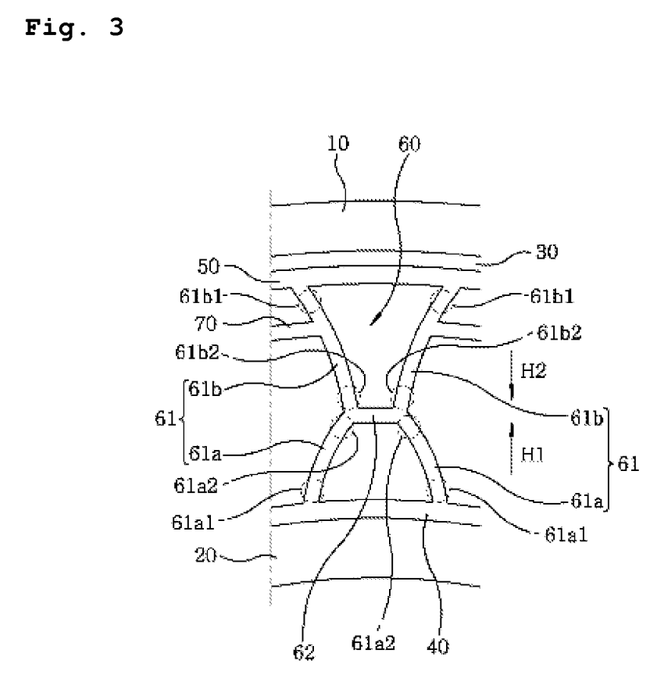
FIG. 3 is an enlarged view of a portion A shown in FIG. 2.
Figure 4:
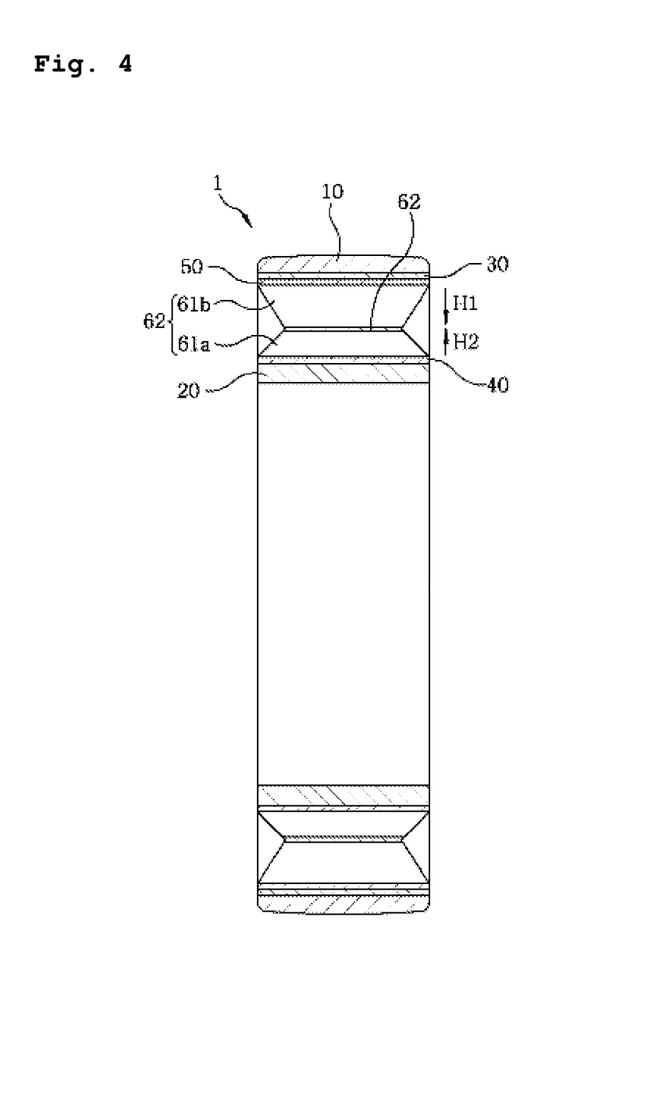
FIG. 4 is a cross-sectional view of the airless tire taken along line IV-IV shown in FIG. 2.

FIG. 1 is a perspective view of the airless tire according to the embodiment of the present invention, FIG. 2 is a front view of the airless tire shown in FIG. 1, FIG. 3 is an enlarged view of a portion A shown in FIG. 2, and FIG. 4 is a cross-sectional view of the airless tire taken along line IV-IV shown in FIG. 2.

Referring to FIGS. 1 to 4, the airless tire 1 according to this embodiment includes a first band 40, a second band 50, a rim 20, a tread 10, a reinforcing layer 30, spokes 61, and first connecting members 62. However, the rim 20, the reinforcing layer 30, and the tread 10 may be omitted.

Each of the first band 40 and the second band 50 has a predetermined width and is formed in the shape of a band of which both ends are connected to each other. The second band 50 is positioned outside the first band 40 with a distance interposed therebetween. Accordingly, the outer surface of the first band 40 faces the inner surface of the second band 50. Each of the first and second bands 40 and 50 may be made of one selected from a group consisting of basalt fiber, filaments based on basalt fiber, and the combination thereof.

Basalt fiber is natural fiber extracted from basalt that is fine-grained rock made of lava flowed to the surface of the earth due to volcanism. Since basalt fiber has excellent mechanical property, basalt fiber is also used as reinforcing fiber for a polymer composite, reinforcing fiber for mending a concrete structure, or the like.

Meanwhile, the rim 20, which is connected to a hub drum (not shown) of a vehicle, is joined to the inner surface of the first band 40. Further, the tread 10, which controls the vehicle and comes into contact with the ground, is joined to the outer surface of the second band 50.

The reinforcing layer 30 is positioned between the second band 50 and the tread 10. The reinforcing layer 30 forms an air layer in the tire and functions to support a load of the vehicle.

Accordingly, the load of the vehicle is smoothly supported by the reinforcing layer 30.

The reinforcing layer 30 may be made of one selected from a group consisting of a steel wire, a steel belt, a fiber cord, a composite, a hollow tube, and the combination thereof.

Further, the reinforcing layer 30 may be made of one selected from a group consisting of basalt fiber, filaments based on basalt fiber, and the combination thereof.

Here, it is preferable that a composite formed by mixing glass fiber and the like to a resin be used as the composite.

The hollow tube has not the form of a composite but the form of a tube.

The spokes 61 are positioned between the first and second bands 40 and 50. The spokes 61 function as a support so that the first band 40 is spaced apart from the second band 50. The spokes 61 are arranged at intervals along the first and second bands 40 and 50. Each of the spokes 61 includes a first member 61*a* and a second member 61*b*.

The first member 61*a* protrudes from the outer surface of the first band 40 toward the second band 50. In this case, one end 61*a*1 of the first member 61*a* is connected to the first band 40 and the other end 61*a*2 thereof is spaced apart from the inner surface of the second band 50. The first members 61*a* are formed at intervals along the outer surface of the first band 40. The protruding first member 61*a* has a predetermined length and is curved. The first member 61*a* is curved so as to be opposite to an adjacent first member 61*a*. Accordingly, the other ends 61*a*2 of adjacent first members 61*a* face each other with a distance interposed therebetween. The distance between the other ends 61*a*2 of the adjacent first members 61*a* is shorter than the distance between one ends 61*a*1 thereof.

It is preferable that the radius R1 of curvature of the first member be 40 mm or more and smaller than 50 mm and the radius R2 of curvature of the second member be 30 mm or more and smaller than 40 mm.

When the radius R1 of curvature of the first member 61*a* is smaller than 40 mm and when the radius R1 of curvature of the second member 61*b* is smaller than 30 mm, fatigue resistance deteriorates due to the interference between parts and flexibility is increased.

The second member 61*b* is positioned on the same line as the axis of the first member 61*a*, and protrudes from the inner surface of the second band 50 toward the first band 40. The second members 61*b* are formed at intervals along the inner surface of the second band 50. One end 61*b*1 of the second member 61*b* is connected to the second band 50, and the other end 61*b*2 thereof is spaced apart from the outer surface of the first band 40. The protruding second member 61*b* has a predetermined length and is curved. The length of the second member 61*b* is longer than the length of the first member 61*a*. The second member 61*b* is curved so as to be opposite to the adjacent second member 61*b*. Accordingly, the other ends 61*b*2 of adjacent second members 61*b* face each other with a distance interposed therebetween. The distance between the other ends 61*b*2 of the adjacent second members 61*b* is shorter than the distance between one ends 61*a*1 thereof. Further, the distance between one ends 61*b*1 of the adjacent second members 61*b* is longer than the distance between adjacent one ends 61*a*1 of the first members 61*a*.

The other ends 61*b*2 of the second members 61*b* are connected to the other ends 61*a*2 of the first members 61*a*. The curved directions of the first and second members 61*a* and 61*b*, which are connected to each other, are opposite to each other. It is preferable that the radius R2 of curvature of the second member be 30 mm or more and smaller than 40 mm.

Meanwhile, as the protruding second members 61b become distant from the second band 50 (H2), the other ends 61b2 of the second members 61b become closer to each other as shown in FIG. 4.

Portions of the curved spokes 61, which are adjacent to the tread 10 coming into contact with the ground, may be bent while being deformed. Then, the deformed spokes 61 can be restored to the original state when the tread 10 deviates from the ground.

The first connecting member 62 and a second connecting member 70 form one spoke cell 60 by connecting adjacent spokes 61. 22 to 26 spoke cells 60 are formed between the first and second bands 40 and 50.

If the number of the spoke cells is in the range of 22 to 26 as described above, it is advantageous in manufacturing a mold in a manufacturing process and it is possible to obtain an advantage of smoothly improving fatigue resistance and dispersing vibration.

If the number of the spoke cells is smaller than 22, there may be a problem in that the transfer of a load deteriorates due to vibration.

Further, if the number of the spoke cells exceeds 26, the stiffness of the airless tire is increased as the number of the spoke cells exceeding 26 is increased. For this reason, there may be a problem in that the ride quality of a vehicle deteriorates.

The first connecting member 62 is positioned between adjacent spokes 61, is positioned at a portion where the first and second members 61a and 61b are connected to each other, and connects the adjacent spokes 61.

Meanwhile, the first connecting member 62 connecting adjacent spokes 61 and the second connecting member 70 connecting the adjacent spoke cells 60 are disposed in a zigzag pattern and connect the spokes 61 and the spoke cells 60. Since the first and second connecting members 62 and 70 are connected in a zigzag pattern, the spokes 61 can be freely deformed.

The second connecting member 70 is positioned between adjacent spoke cells 60. The second connecting member 70 connects the second members 61b. The length of the second connecting member 70 is longer than the length of the first connecting member 62.

The first connecting member 62 connects adjacent spokes 61 to form one spoke cell 60 and the second connecting member 70 connects adjacent spoke cells 60, so that a plurality of spaces are formed between the first and second bands 40 and 50.

Figure 5:
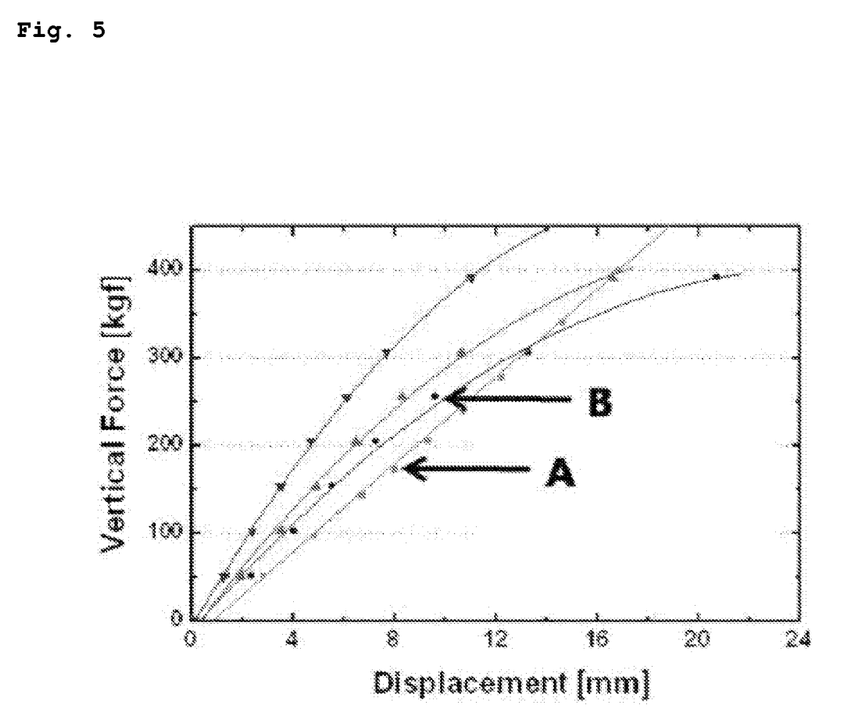
FIG. 5 is a performance evaluation diagram of the airless tire shown in FIG. 2.

Referring to FIGS. 3 and 5, a vertical load is applied to the tread 10 when the tread 10 is perpendicular to the drum while coming into contact with the ground. In this case, a distance between the first and second bands 40 and 50 is reduced. Adjacent spokes 61, which are positioned between the first and second bands 40 and 50 between which the distance is reduced, are deformed so as to face each other while the radii of curvature thereof are reduced. Accordingly, a distance L1 is reduced. The reason for this is that a distance between portions of adjacent spokes 61 where the first and second members 61a and 61b are connected to each other is reduced due to the curved structures of the first and second members 61a and 61b. The first connecting member 62 is compressed while the distance L1 is reduced. Further, the first connecting member 62 may approach the second band 50. The deformed adjacent spokes 61 do not interfere with each other by the compressed first connecting member 62. Furthermore, while the distance between the adjacent spokes 61 is reduced, the distance between the portions of the adjacent spoke cells 60 corresponding to the second member 61b is increased.

That is, when the adjacent spokes 61, which are formed of the connected first and second members 61a and 61b, are deformed in a direction where the adjacent spokes 61 approach each other, the spokes 61 are deformed in the form of the bending and stretching of an air tire. Accordingly, the control and the ride quality of a vehicle are improved.

In other words, the airless tire 1 having this structure is deformed so that the distances between the tread 10 coming into contact with the ground and the adjacent spokes 61 are reduced. In this case, the adjacent spokes 61 do not interfere with each other by the first connecting member 62. Moreover, the adjacent spoke cells 60 do not interfere with each other by the second connecting member 70. Since the adjacent spokes 61 and the spoke cells 60 do not interfere with each other, it is possible to obtain an effect of preventing the generation of noise and an effect of improving fatigue resistance.

When the tread 10 deviates from a portion perpendicular to the drum and is separated from the ground, the deformed spoke 61 can be restored to the original state due to the elastic force thereof. The tire is not excessively compressed by a load generated when the drum and the tread 10 are perpendicular to each other, so that the tire can perfectly perform an original function.

The spoke cells 60, which are formed by the connection of the curved spokes 61, are positioned between the first and second bands 40 and 50, so that the structural stiffness of the airless tire 1 according to the present invention is harmonized. Further, the spokes 61 and the spoke cells 60 are connected to each other by the first and second connecting members 62 and 70 and support the load of the vehicle, so that the contact surface of the airless tire 1 coming into contact with the ground is formed uniformly. Furthermore, since the curved spokes 61 are deformed, the durability of the spoke and the absorption of shock, which is generated from the road surface and transmitted to a driver, can be improved.

In the airless tire 1, the spoke cells 60 supporting the first and second bands 40 and 50 are positioned between the first and second bands 40 and 50 and the spokes 61 and the spoke cells 60 are connected to each other by the first and second connecting members 62 and 70. Accordingly, both a compressive force and a tensile force can be achieved by the harmonization of structural stiffness. Further, the dispersion of stress is improved by the deformation of the spokes 61. As a result, the fatigue resistance of the structure of the spokes 61 is improved.

Referring to the result of the static characteristic performance evaluation of the airless tire 1 (see FIG. 5), it is found that the static characteristic performance of the airless tire (denoted by B) having the structure of the curved spokes 61 and the curved spoke cells 60 of the present invention, which are connected to each other by the first and second connecting members 62 and 70, is improved as compared to a case where the spokes in the related art are made of an auxetic material (denoted by A).

As a result, it is found that the airless tire (denoted by B) has a high shock absorption rate and has high resistance against a static load.

Figure 6:
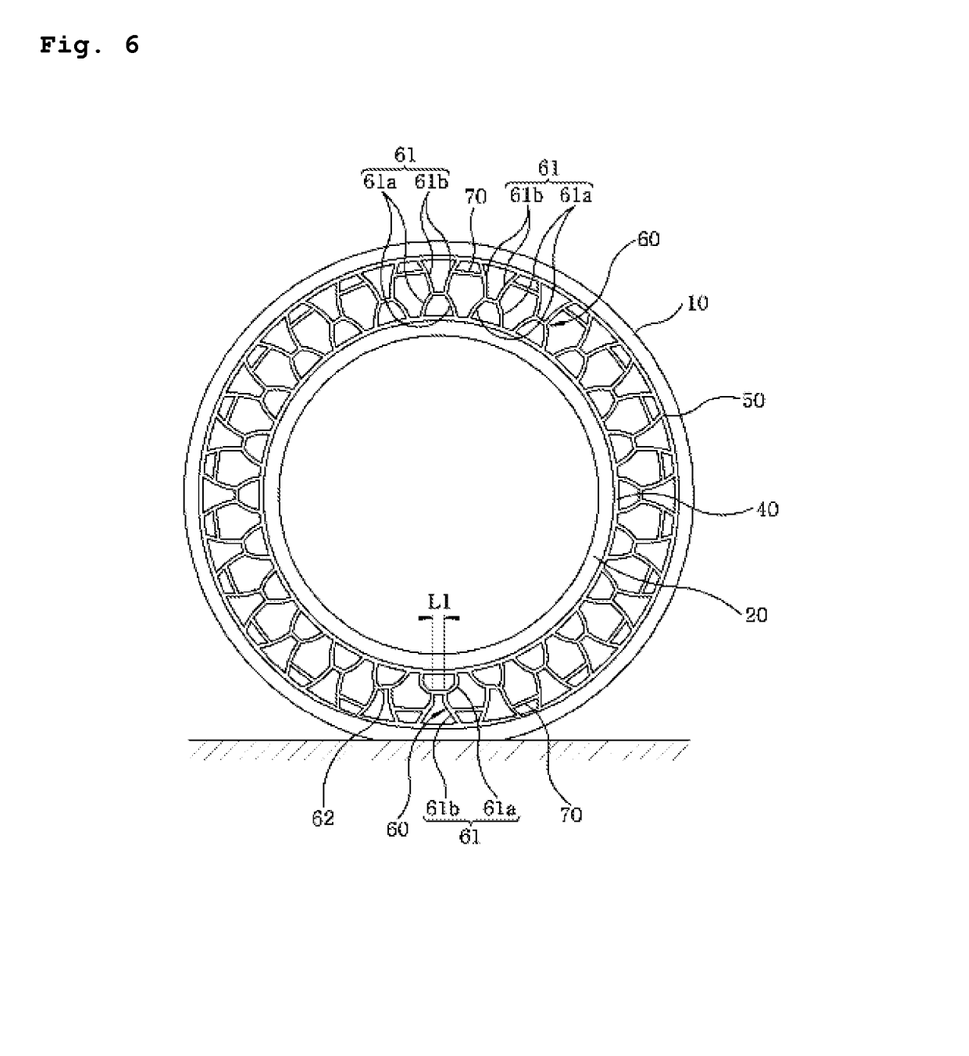
FIG. 6 is a view showing a state where the airless tire shown in FIG. 2 comes into contact with the ground.

Referring to FIG. 3, as shown in FIG. 6, the other ends 61a2 of the first members 61a become closer to each other as the protruding first members 61a become distant from the first band 40, and the other ends 61b2 of the second members 61b become closer to each other as the protruding second members 61b become distant from the second band 50. Accordingly, the strain of the spoke 61 is improved. The function as a tire can be improved without air pressure that is most important for the exhibition of the performance of an air tire. That is, since the adjacent spokes 61 do not interfere with each other, a footprint similar to the footprint of an air tire can be formed.

In other words, the airless tire 1 according to the present invention can sufficiently support the load of the vehicle by the harmonized structural stiffness of the spokes 61. Further, since both a compressive force and a tensile force are achieved, the fatigue resistance of the structure of the spokes is improved by the improvement of the dispersion of stress. Further, the absorption performance against vibration, which is applied to a driver from the ground through a hub of the vehicle, is improved by the dispersion of vibration, so that it is possible to provide a comfortable ride quality.

Accordingly, the durability of the airless tire is improved, the control performance of a vehicle is improved, and shock applied from the road surface is dispersed well, so that it is possible to expect not only the improvement of durability and but also the improvement of control performance and ride quality performance of a vehicle.

For reference, the spoke 61 of the present invention has been formed in a curved shape in the above-mentioned description and drawings, and the shape of the spoke 61 of the present invention is not limited to this shape. A structure where the spokes 61, which are positioned at the portion of the tread 10 coming into contact with the ground, can freely deformed by a load, can be applied to the present invention without limit.

A preferred embodiment of the present invention has been described in detail above, but the scope of the invention is not limited thereto and various modifications and changes, which use the concept of the present invention defined in the following claims and are made by those skilled in the art, are also included in the scope of the invention.

What is claimed is:

1. An airless tire comprising:
   a circular first band;
   a second band that surrounds the first band while being spaced apart from the first band, and has a diameter larger than the diameter of the first band;
   a plurality of spokes that connect the first band to the second band, are disposed between the first and second bands, and contract or expand by a load transmitted from outside the airless tire;
   wherein each spoke includes a pair of first members, a pair of second members, and a first connecting member; and
   wherein adjacent spokes are connected to each other via a second connecting member extending from each spoke to an adjacent spoke to disperse a load applied to the plurality of spokes;
      wherein each of the first members has a first end opposite from a second end, wherein each of the first members protrude at each respective first end from the first band toward the second band;
      wherein each of the second members has a first end opposite from a second end, wherein each of the second members protrude at each respective first end from the second band toward the first band;
      wherein the first connecting member has a first end opposite from a second end, wherein the first end of the first connecting member connects the second end of one of the first members to the second end of one of the second members, and wherein the second end of the first connecting member connects the second end of the other first member to the second end of the other second member;
      wherein each of the first members and the second members have a curved shape, wherein one of the pairs of members curves inward with each of the members extending toward each other while the other pair of members curves outward away from each other.

2. The airless tire according to claim 1, wherein the first and second connecting members are disposed in a zigzag pattern.

3. The airless tire according to claim 1, further comprising:
   a tread that is connected to the outer surface of the second band; and
   a reinforcing layer that is positioned between the second band and the tread.

4. The airless tire according to claim 3, wherein the reinforcing layer is selected from a group consisting of a steel wire, a steel belt, a fiber cord, a composite, a hollow tube, and combinations thereof.

5. The airless tire according to claim 4, wherein the reinforcing layer is selected from a group consisting of basalt fiber, filaments based on basalt fiber, and combinations thereof.

6. The airless tire according to claim 1, wherein each of the first and second bands is selected from a group consisting of basalt fiber, filaments based on basalt fiber, and combinations thereof.

7. The airless tire according to claim 1, wherein the radius (R1) of curvature of each first member is 40 mm or more and smaller than 50 mm, and the radius (R2) of curvature of each second member is 30 mm or more and smaller than 40 mm.

8. The airless tire according to claim 1, wherein the length of the second connecting member is longer than the length of the first connecting member.

9. The airless tire according to claim 1, wherein the length of each second member is longer than the length of each first member.

10. An airless tire comprising:
    a circular first band;
    a second band that surrounds the first band while being spaced apart from the first band, and has a diameter larger than the diameter of the first band;
    a plurality of spokes that connect the first band to the second band, are disposed between the first and second bands, and contract or expand by a load transmitted from outside the airless tire,
    wherein each spoke includes a pair of first members, a pair of second members, and a first connecting member;
    wherein adjacent spokes are connected to each other via a second connecting member extending from each spoke to an adjacent spoke to disperse a load applied to the plurality of spokes;
       wherein each of the first members has a first end opposite from a second end, wherein each of the first members protrude at each respective first end from the first band toward the second band, wherein a distance between the second ends of the first members is shorter than a distance between first ends of the first members, wherein each of the first members has a curved shape, and wherein the first members curve away from each other;
       wherein each of the second members has a first end opposite from a second end, wherein each of the second members protrude at each respective first end from the second band toward the first band, wherein a distance between the first ends of the second members is longer than a distance between second ends of the second members, wherein each of the second members has a curved shape, and wherein the second members curve toward each other; and wherein the first connecting member has a first end opposite from a second end, wherein the first end of the first connecting member connects the second end of one of the first members to the second end of one of the second members, and wherein the second end of the first connecting member connects the second end of the other first member to the second end of the other second member such that the distance between the second ends of the first members equals the distance between the second ends of the second members.

11. The airless tire according to claim 1, further comprising:
a tread that is connected to the outer surface of the second band; and
a reinforcing layer that is positioned between the second band and the tread.

12. The airless tire according to claim 11, wherein the reinforcing layer is selected from a group consisting of a steel wire, a steel belt, a fiber cord, a composite, a hollow tube, and combinations thereof.

13. The airless tire according to claim 12, wherein the reinforcing layer is selected from a group consisting of basalt fiber, filaments based on basalt fiber, and combinations thereof.

14. The airless tire according to claim 1, wherein each of the first and second bands is selected from a group consisting of basalt fiber, filaments based on basalt fiber, and combinations thereof.

15. The airless tire according to claim 1, wherein the radius (R1) of curvature of the first member is 40 mm or more and smaller than 50 mm, and the radius (R2) of curvature of the second member is 30 mm or more and smaller than 40 mm.

16. The airless tire according to claim 1, wherein the length of the second connecting member is longer than the length of the first connecting member.

17. The airless tire according to claim 1, wherein the length of each second member is longer than the length of each first member.

18. An airless tire comprising:
a circular first band;
a second band that surrounds the first band while being spaced apart from the first band, and has a diameter larger than the diameter of the first band;
a plurality of spokes that connect the first band to the second band, are disposed between the first and second bands, and contract or expand by a load transmitted from outside the airless tire,
wherein each spoke includes a pair of first members, a pair of second members, and a first connecting member;
wherein adjacent spokes are connected to each other via a second connecting member extending from each second member of each spoke to a second member of an adjacent spoke to disperse a load applied to the plurality of spokes;
wherein each of the first members has a first end opposite from a second end, wherein each of the first members protrude at each respective first end from the first band toward the second band, wherein a distance between the second ends of the first members is shorter than a distance between first ends of the first members, wherein each of the first members has a curved shape, and wherein the first members curve away from each other;
wherein each of the second members has a first end opposite from a second end, wherein each of the second members protrude at each respective first end from the second band toward the first band, wherein a distance between the first ends of the first members is longer than a distance between second ends of the second members, wherein each of the second members has a curved shape, wherein the second members curve toward each other, wherein the length of each second member is longer than the length of each first member;
wherein the first connecting member has a first end opposite from a second end, wherein the first end of the first connecting member connects the second end of one of the first members to the second end of one of the second members, and wherein the second end of the first connecting member connects the second end of the other first member to the second end of the other second member such that the distance between the second ends of the first members equals the distance between the second ends of the second members; and
wherein the length of the second connecting member is longer than the length of the first connecting member.

19. The airless tire according to claim 18, wherein the radius (R1) of curvature of the first member is 40 mm or more and smaller than 50 mm, and the radius (R2) of curvature of the second member is 30 mm or more and smaller than 40 mm.

20. The airless tire according to claim 18,
wherein the first end of each first member of each spoke protrudes from the first band without contacting the first end of the first member of an adjacent spoke;
wherein the first end of each second member of each spoke protrudes from the second band without contacting the first end of the second member of an adjacent spoke; and
wherein each spoke is connected to an adjacent spoke only via the second connecting member that connects adjacent spokes.

* * * * *